US011538020B2

(12) United States Patent
Hallaq et al.

(10) Patent No.: US 11,538,020 B2
(45) Date of Patent: Dec. 27, 2022

(54) COMPUTER-BASED SYSTEMS AND DEVICE CONFIGURED FOR TEMPORARY ELECTRONIC ACCOUNT LINKING TO DISPOSABLE TAGS AND METHODS THEREOF

(71) Applicant: Capital One Services, LLC, McLean, VA (US)

(72) Inventors: Laith Hallaq, Manassas Park, VA (US); Maneill Parekh, McLean, VA (US); Ruby Rue Roman Estremera, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 146 days.

(21) Appl. No.: 17/010,291

(22) Filed: Sep. 2, 2020

(65) Prior Publication Data

US 2022/0067700 A1  Mar. 3, 2022

(51) Int. Cl.
*G06Q 20/34* (2012.01)
*G06K 7/10* (2006.01)
*G06K 19/07* (2006.01)

(52) U.S. Cl.
CPC ....... *G06Q 20/352* (2013.01); *G06K 7/10366* (2013.01); *G06K 19/0723* (2013.01)

(58) Field of Classification Search
None
See application file for complete search history.

(56) References Cited

U.S. PATENT DOCUMENTS

| | | | |
|---|---|---|---|
| 11,042,850 B2* | 7/2021 | Bennett | B60R 19/56 |
| 2011/0173686 A1* | 7/2011 | Ueno | H04N 1/00204 726/6 |
| 2012/0226582 A1* | 9/2012 | Hammad | G06Q 20/425 705/35 |
| 2015/0095239 A1* | 4/2015 | Specogna | G06Q 20/405 705/72 |
| 2020/0036695 A1* | 1/2020 | Sharp | G06Q 20/3572 |
| 2020/0234300 A1* | 7/2020 | Vukich | G06Q 20/3552 |
| 2021/0406869 A1* | 12/2021 | Pathrabe | G06Q 20/38215 |

OTHER PUBLICATIONS

Yinzhi Cao, Xiang Pan and Yan Chen, "SafePay: Protecting against credit card forgery with existing magnetic card readers," 2015 IEEE Conference on Communications and Network Security (CNS), 2015, pp. 164-172, doi: 10.1109/CNS.2015.7346825. (Year: 2015).*

* cited by examiner

*Primary Examiner* — Gregory S Cunningham, II
(74) *Attorney, Agent, or Firm* — Greenberg Traurig, LLP

(57) ABSTRACT

Systems and methods of the present disclosure processors and devices for providing disposable account cards using a contactless reader and contactless communication tag. A processor receives, via an antenna module from the contactless reader, radio signal data of a radio signal emitted by a contactless tag, where the radio signal data includes encoded tag data including a tag identifier. The processor determines that the contactless tag is a new contactless tag based on the tag identifier being unlinked to any account, and generates a disposable account card identifier in a user account including a unique disposable account number. The processor generates an account link that links the tag identifier to the disposable account card identifier such that the tag identifier refers to the unique disposable account number for performing contactless electronic requests to the user account in place of a user account card.

20 Claims, 9 Drawing Sheets

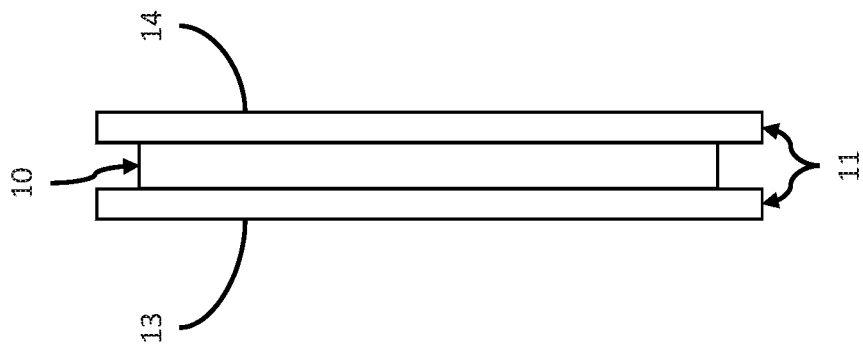
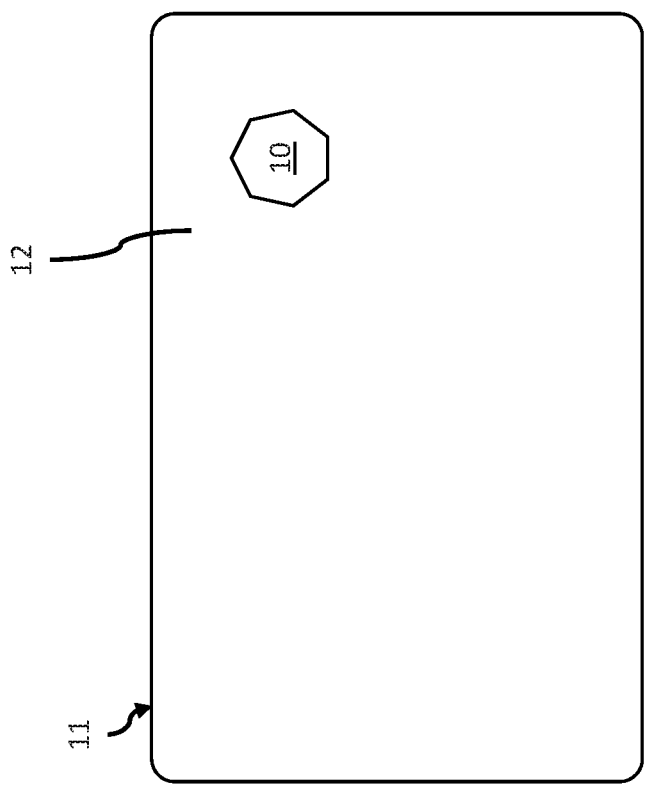

# COMPUTER-BASED SYSTEMS AND DEVICE CONFIGURED FOR TEMPORARY ELECTRONIC ACCOUNT LINKING TO DISPOSABLE TAGS AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to improved computer-based systems and devices configured for electronic account access using disposable devices, e.g., contactless chips and readers thereof for secure and fraud-resistant account management, and methods of use thereof.

BACKGROUND OF TECHNOLOGY

User accounts may be identified by account-specific information, such as account handles, usernames, numbers, or other account identifiers. However, providing account information to third-parties during the course of activities with the third-party may present a risk to the security of the user's electronic account. Yet, for many activities for which an electronic account may be used, a sharing of account information is necessary to effectuate the activities. There exists to solution for providing limited, temporary access to an electronic account without sharing the account information, particularly during physical or in-person activities.

SUMMARY OF DESCRIBED SUBJECT MATTER

In some embodiments, the present disclosure provides an exemplary computer-based method that includes at least the following steps of receiving, by at least one processor of at least one computing device via an antenna module from a contactless reader of the at least one computing device, a contactless radio signal data of a contactless radio signal emitted by a contactless communication tag in response to an interrogation signal, where the contactless radio signal data includes encoded tag data, where the encoded tag data includes a tag identifier of the contactless communication tag; determining, by the at least one processor, that the contactless communication tag is a new contactless communication tag based on the tag identifier being unlinked to any user account; generating, by the at least one processor, disposable account card identifier in in a user account, the disposable account card identifier including a unique disposable account number; generating, by the at least one processor, an account link that links the tag identifier to the disposable account card identifier such that the tag identifier refers to the unique disposable account number for performing contactless electronic requests to the user account in place of a user account card; generating, by the at least one processor, a disposable account card interface and a user interface element; wherein the disposable account card interface is configured to allow the user to perform the contactless electronic requests with the contactless communication tag and wherein the user interface element is configured to enable a user to delete the account link to remove a reference between the disposable account card identifier and the user account; and causing to display, by the at least one processor, the disposable account card interface on a display of at least one computing device associated with the contactless reader.

In some embodiments, the present disclosure provides an exemplary computer-based method that includes at least the following steps of receiving, by at least one processor, an electronic account activity request from at least one computing device, where the electronic account activity request includes: i) a tag identifier decoded from an encoded tag data of a contactless radio signal data of a contactless radio signal emitted by a contactless communication tag in response to an interrogation signal by a contactless reader of the at least one computing device, ii) a data transfer content associated with a requested data transfer, and iii) a transferee account identifier identifying a destination account for the requested data transfer determining, by the at least one processor, an account link that links the contactless communication tag to a user account by using the tag identifier to refer to a unique disposable account card identifier; determining, by the at least one processor, disposable account card identifier associated with the tag identifier based on the account link; wherein the disposable account card identifier comprising a unique disposable account number; generating, by the at least one processor, an account activity authorization associated with the disposable account card identifier to fulfill the electronic account activity request by transferring the requested transfer quantity from the user account to the destination account based at least in part on the unique disposable account number, the data transfer content and the transferee account identifier; updating, by the at least one processor, a disposable account card interface and a user interface element; wherein the disposable account card interface is configured to allow a user to delete the account link to remove the disposable account card data from the user account; and causing to display, by the at least one processor, the disposable account card interface on a display of at least one computing device associated with the contactless reader.

In some embodiments, the present disclosure provides an exemplary computer-based system that includes at least the following components of at least one processor of at least one computing device via an antenna module from a contactless reader of the at least one computing device. The at least one processor is configured to implement instructions causing the at least one processor to perform steps to: receive, via an antenna module from a contactless reader, a contactless radio signal data of a contactless radio signal emitted by a contactless communication tag in response to an interrogation signal; where the contactless radio signal data includes encoded tag data; where the encoded tag data includes a tag identifier of the contactless communication tag; determine that the contactless communication tag is a new contactless communication tag based on the tag identifier being unlinked to any user account; generate disposable account card identifier in in a user account, the disposable account card identifier including a unique disposable account number; generate an account link that links the tag identifier to the disposable account card identifier such that the tag identifier refers to the unique disposable account number for performing contactless electronic requests to the user account in place of a user account card; generate a disposable account card interface and a user interface element; wherein the disposable account card interface is configured to allow the user to perform the contactless electronic requests with the contactless communication tag and wherein the user interface element is configured to enable a user to delete the account link to remove a reference between the disposable account card identifier and the user account; and cause to display the disposable account card interface on a display of at least one computing device associated with the contactless reader.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 1-9 show one or more schematic flow diagrams, certain computer-based architectures, and/or screenshots of various specialized graphical user interfaces which are illustrative of some exemplary aspects of at least some embodiments of the present disclosure.

DETAILED DESCRIPTION

Figure 2:
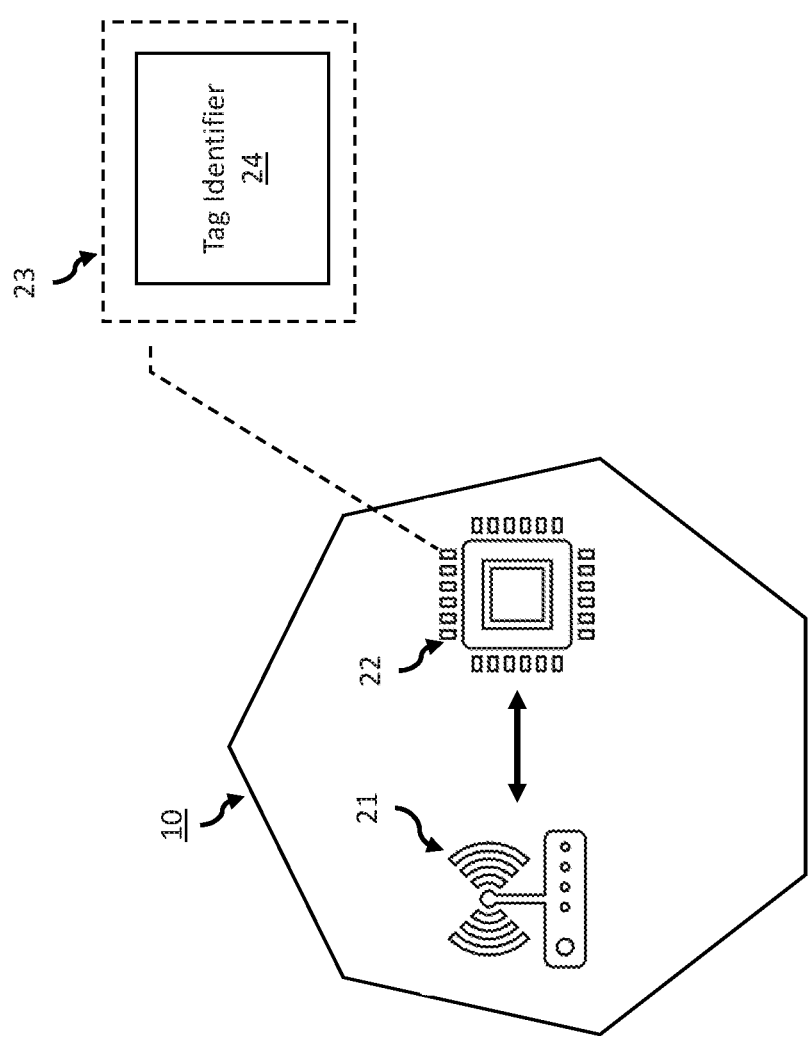

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of performing electronic account-related activities using temporary and secure account information. The following embodiments provide technical solutions and technical improvements that overcome technical problems, drawbacks and/or deficiencies in the technical fields involving the confidentiality of electronic account access information and the in-person applicability of temporary account information. As explained in more detail, below, technical solutions and technical improvements herein include aspects of improved temporary electronic account information that enables single or temporary use of the information to effectuate account activities between parties, while maintaining capabilities for in-person activity initiation. For example, in-person transactions, e.g., with credit cards, debit cards, or other physical payment device to initiate payment from a user account, are subject to fraud and stolen information. Thus, disposable card numbers that temporarily link to the user account can help prevent the theft or fraud of the credit card or debit card information. However, numbers themselves are difficult to user for in-person and point-of-sale transactions. Accordingly, the use of electronic devices, such as radio-frequency identification (RFID), near-field communication (NFC) or other contactless chip tags, to electronically perform in-person and point-of-sale transactions can be configured to implement the temporary information to enable in-person and point-of-sale payments while maintaining the confidentiality afforded by the temporary account number or link. Based on such technical features, further technical benefits become available to users and operators of these systems and methods. Moreover, various practical applications of the disclosed technology are also described, which provide further practical benefits to users and operators that are also new and useful improvements in the art.

FIGS. 1A and 1B are diagrams of an exemplary virtual card with accompanying contactless tag for in-person account activities in accordance with one or more embodiments of the present disclosure.

In some embodiments, a virtual card 11, such as, e.g., card stock similar to credit cards or debit cards, or other physical implement for carrying the contactless communication tag 10. In some embodiments, the contactless communication tag 10 can include any passive or active electronic device for emitting electromagnetic fields carrying document-related data and information. For example, the contactless communication tag 10 may be a radio frequency identification (RFID) chip or near field communication (NFC) chip, or other similar electromagnetic signal emitting circuitry.

In some embodiments, the contactless communication tag 10 can be paired with a user account to provide account activity authorization during in-person activities. Thus, the contactless communication tag 10 may store and communicate tag data that facilitates the activity authorization. In some embodiments, the contactless communication tag 10 may communicate the tag data via, e.g., electromagnetic signals or fields. In some embodiments, the tag data can be read by any tag reader or interrogator device that is suitable for receiving the electromagnetic fields emitted by the contactless communication tag 10. Thus, the tag data can be compared with, e.g., account data, financial instruction records data, and other data to authorize an activity with respect to an associated user account.

In some embodiments, the contactless communication tag 10 can include mechanisms for attached the contactless communication tag 10 to a card substrate 12 of the virtual card 11. For example, e.g., an adhesive layer may be employed on a surface of the contactless communication tag 10 to adhere the tag to the card substrate 12. The adhesive layer may include, e.g., a heat activated adhesive, a moisture activated adhesive, a press-sensitive tape, a glue, resin or epoxy, or other adhesive substance.

In some embodiments, however, the contactless communication tag 10 may be embedded in the card substrate 12, e.g., between a first card face 13 and a second card face 14, such as the front and back of the card 12. However, other techniques may be employed to embed the contactless communication tag 10 in the card substrate 12, such as, e.g., fitting the contactless communication tag 10 into a cavity or recession extending beneath a plane of a surface of the contactless communication tag 10. In some embodiments, the contactless communication tag 10 may be integrally formed in the card substrate 12, e.g., via photolithographic printing or other method.

FIG. 2 is a diagram of another exemplary contactless tag for a virtual card in accordance with one or more embodiments of the present disclosure.

In some embodiments, the contactless communication tag 10 includes components for storing and communicating data without contact or a physical connection with an external device, such as, e.g., a mobile device, computer, laptop, point-of-sale payment device, or other external device. Contactless communication may be facilitated with an antenna 21 operating at a frequency suitable to convey document related data to nearby devices. For example, the antenna 21 may operate at a near-field communication (NFC) frequency. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

In some embodiments, the antenna 21 may be a passive tag that is energized by a received reader or interrogator signal, and emits an electromagnetic field in response to the received signal, such as a radio frequency signal. Accordingly, in some embodiments, the antenna 21 may include any suitable passive RFID tag. In some embodiments, the RFID tag may operate at 120-150 kHz unregulated band, 13.56 MHz on ISO/IEC 18000-3 air interface or at other frequency bands and at rates ranging from 106 kbit/s to 424 kbit/s or greater. The antenna 21 may have a communication range of between about 0 and about 1 meter in range.

In some embodiments, the contactless communication tag 10 pairs the antenna 21 with an integrated circuit 22 for storing and manipulating data, and for modulating and demodulating the frequency of signals emitted by the antenna 22. In some embodiments, the integrated circuit 22 may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processing device may include data-processing capacity provided by the microprocessor. In some embodiments, the microprocessor may include memory, processing, interface resources, controllers, and counters. In some embodiments, the microprocessor may also include one or more programs stored in memory.

In some embodiments, the integrated circuit 22 includes data for performing, e.g., contactless account activities, e.g., between user computing devices, for payments via point-of-sale devices, or for any other contactless account activity. In some embodiments, the integrated circuit 22 may store, e.g., a tag identifier 24 in a tag data 23 of the integrated circuit. The tag identifier 24 may be linked to a user account on a temporary or permanent basis. Thus, a return to an interrogator or reader of the tag identifier 24 may be used to identify a user account associated with virtual card 11. In some embodiments, instead or in addition to the tag identifier 24, the tag data 23 may also include, e.g., a virtual card number or other temporary account information, an applet identifier to reference a particular applet for utilizing the tag identifier 24 or temporary account information or both, among other data for facilitating in-person account activities without user account information or online account activities.

In some embodiments, the tag data 23 may include a protected storage device for recording the tag identifier 24, or other data (e.g., temporary account information data, applet data, etc.). In some embodiments, the protected storage ensures that upon generating temporary account information and linking such information to the tag identifier 24 (or writing the temporary account information directly into the tag data 23), the data becomes read-only such that no later users or other persons may alter the data.

In some embodiments, upon subsequent communications by a reader or interrogator device, an applet executed by the reader or interrogator device may be configured to receive and decode the tag data 23. Thus, the integrated circuit 22 may receive a request for the tag data 23, e.g., via the antenna 21, and automatically perform the software instructions of the integrated circuit 22 to encode the tag data 23 including the tag identifier 24 for contactless communication back to the reader or interrogator by the antenna 21.

Figure 3:
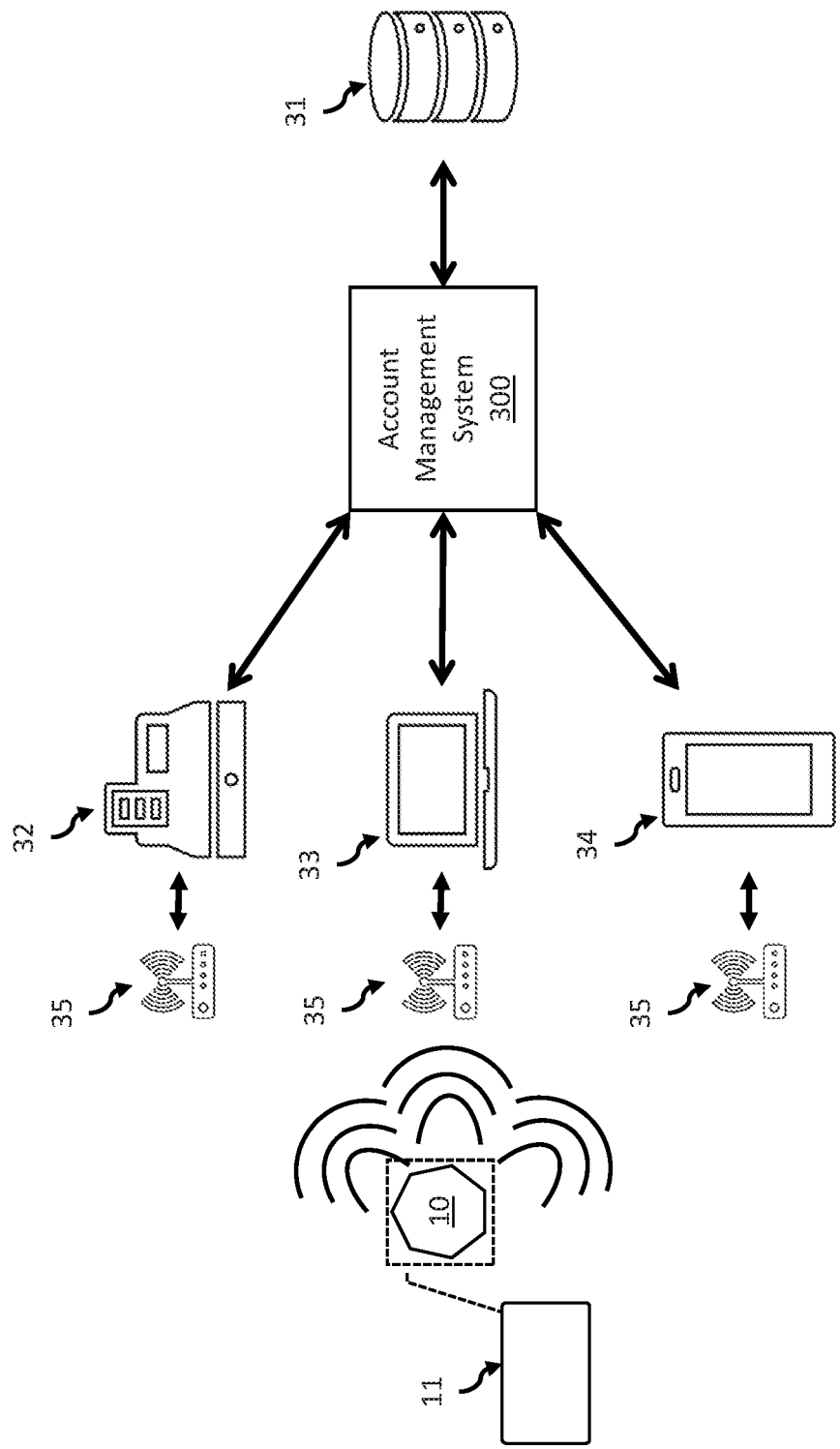

FIG. 3 is a block diagram of another exemplary computer-based system and platform for electronic account activity authorization using a virtual card with a contactless tag in accordance with one or more embodiments of the present disclosure.

In some embodiments, an account management system 300 may be in communication with multiple computing device and an account database 31. In some embodiments, the account database 31 includes user account associated with each user registered with the account management system 300. In some embodiments, the user accounts may include financial accounts, such as, e.g., checking accounts, savings accounts, credit accounts, investment accounts, loan or mortgage accounts, among other financial accounts. The account management system 300 may manage the balance of each user account as well as authorizing, executing, posting, or otherwise facilitating transactions associated with user account in the account database 31. In some embodiments, each change made to a user account may be managed and controlled by the account management system 300 and recorded in the account database 31. Thus, for each transaction associated with a user account, the account management system 300 may identify the user account recorded in the account database 31 and attribute the change to the user account, causing a change in the recorded balance. Each change resulting from each transaction may be recorded in the account database 31 to form a record for each account of transaction entries representing each transaction.

In some embodiments, the computing devices may be employed to initiate a transaction. Such computing devices may include, e.g., a mobile device 34, a user computing device 33, a point-of-sale device 32, or any other computing device for accessing the account management system 300 to view user accounts, manage user accounts, request transactions to user accounts, or other account related operations.

In some embodiments, such account related operations can include the use of account information, such as, e.g., account numbers or other persistent and permanent account-identifiable information. Ordinarily, a user would present a payment device, such as a credit card or debit, for communication of the persistent account information to specialized devices for reading, e.g., a magnetic strip, RFID chip, or other medium storing the persistent account information. However, such methods rely on the use of easily attainable and permanent account information, making the use of such payment devices subject to fraud and theft.

In some embodiments, however, the use of disposable account information provides a protection against such fraud and theft by mitigating the degree to which the fraudster or thief could use the information. Such disposable information is not compatible with the usual payment devices because such payment devices are designed to be authoritative and persistent methods of payment. The virtual card 11 with the contactless communication tag 10, however provides a physical embodiment of temporary and disposable account information for conducting in-person account activities with limited risk. Therefore, the contactless communication tag 10 may interface with the interrogator 35 of the computing devices to effectuate account activities between parties in-person without the use of permanent or authoritative account information and without the need for online or application-based payment platforms. Thus, the virtual card 11 may be employed in a similar manner by a user to traditional payment devices, without the risks associated with exchanging permanent and authoritative account information.

In some embodiments, the computing devices, including the mobile device 34, the user computer device 33, the point-of-sale device 32, or other computing device, may include an interrogator 35. In some embodiments, similar to the antenna 21 described above, the interrogator 35 may be configured to emit a short-range electromagnetic field using, e.g., RFID or NFC protocols to communicate data. However, different from the antenna 21, the interrogator 35 emits the electromagnetic field with sufficient power to cause the field to power the contactless communication tag 10 and return a reply signal to the interrogator 35.

In some embodiments, the interrogator 35 signal may include, e.g., a request to read data stored on the contactless communication tag 10, a request to write data to the contactless communication tag 10, a request to modify data on the contactless communication 10, or some other operation. However, in some embodiments, the contactless communication tag 10 is configured to ensure security and authenticity of the tag data 23 stored thereon, including any virtual card 11 related data (e.g., tag identifier 24, virtual card identifier, virtual or disposable account identifier, among other disposable data). Therefore, in some embodiments, a user device, such as the user computing device 33 or the mobile device 34 may write tag data 23 including the tag identifier or virtual account identifier or both to the contactless communication tag 10 once, after which, the data is read-only. Thereafter, interactions between a computing device via the interrogator 35 and the contactless communication tag 10 can be used to request the tag data 23 without any permission to add or modify tag data 23.

In some embodiments, an interaction via the interrogator 35 may be used to pair the contactless communication tag 10 and virtual card 11 to a user account in the account database 31. To do so, the computing device associated with the interrogator 35 may instruct the interrogator 35 to emit a reader signal to communicate with a new, uninitialized contactless communication tag 10. Because the contactless communication tag 10 is uninitialized, the tag identifier is not linked to any account. Thus, an applet running on the computing device may search the account database 31, e.g., via the account management system 300, for a user account associated with the tag data, and no user account is found. The computing device may recognize that such a response from the account management system 300 indicates the uninitialized contactless communication tag 10 and may generate an interface for initializing the tag. For example, the computing device may open an application or a web page associated with connecting the virtual card 11 to a user account.

In some embodiments, the applet of the computing device may automatically recognize the user account of a user at the computing device based on login information used to access the account management system 300 (e.g., via an application or webpage such as an online banking application or website). However, in some embodiments, the user may be a representative associated with the account management system 300 (e.g., a teller a financial institution). Where the user is the representative, the applet may provide a user input element to enter account information for which the virtual card 11 is to be connected.

In some embodiments, using the tag identifier 24 decoded from the tag data 23 of the contactless communication tag 10, the applet may instruct the account management system 300 to associate the contactless communication tag 10, and by extension, the virtual card 11, with the specified user account. In some embodiments, associating the contactless communication tag 10 with the user may include, e.g., generating a tag-specific virtual account identifier, such as, e.g., a virtual account number or other disposable account number. In some embodiments, the tag-specific virtual account identifier may be configured to refer to the user account selected by the user or representative, thus forming a temporary proxy for the authoritative account identifier (e.g., financial account number, credit card number, or other account identifier). While the tag identifier 24 could be linked with the authoritative account identifier, generating the tag-specific virtual account identifier as a link between the tag identifier 24 and the authoritative account identifier allows for the virtual card 11 to be a disposable, temporary payment device that can be used without providing the actual account information for the user account.

In some embodiments, subsequent interrogations of the contactless communication tag 10 after generating the account link may automatically cause the contactless communication tag 10 to return a tag signal carrying tag data 23 including the tag identifier 24. The applet may then automatically send a request, including the tag identifier 24, to the account management system 300 for the user account. Because the tag identifier 24 has been linked to a particular user account, the account management system 300 may identify the user account and authorize any account activities using the tag identifier 24 and/or the tag-specific virtual account identifier, thus facilitating an in-person account activity without the use of the account information of the user account.

Figure 4:
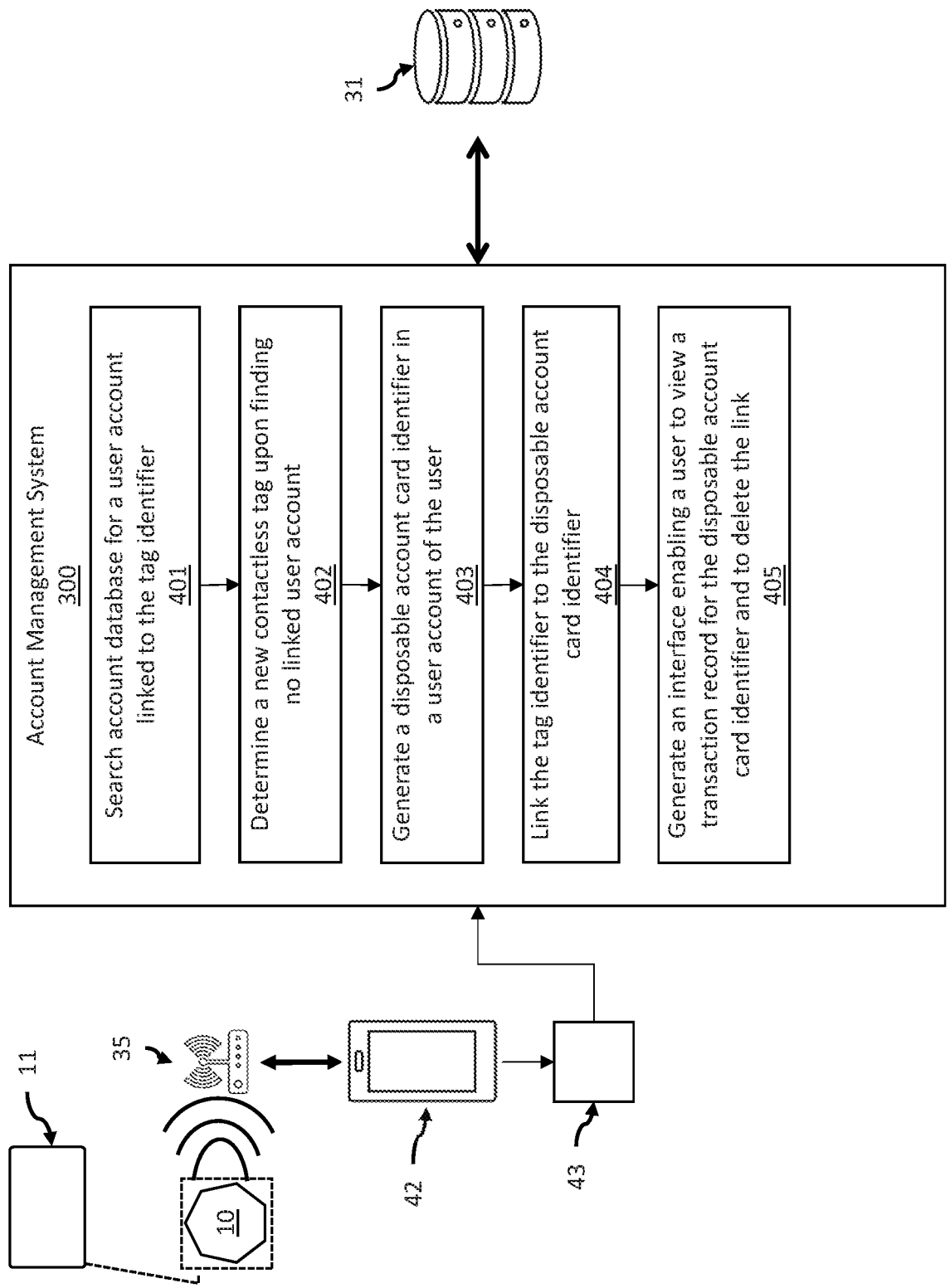

FIG. 4 is a block diagram of another exemplary computer-based system and platform for virtual card initialization using a contactless tag in accordance with one or more embodiments of the present disclosure.

In some embodiments, a user device 42 running an account management application may control an interrogator 35 to emit an electromagnetic field. In some embodiments, upon the virtual card 11 with the contactless communication tag 10 being brought into the vicinity of the interrogator 35, the electromagnetic field of the interrogator 35 may power the contactless communication tag 10. As a result, the contactless communication card 10 automatically emits a response signal to the interrogator 35. In some embodiments, response signal includes a contactless radio signal carrying tag data from the integrated circuit of the contactless communication tag 10.

In some embodiments, the application on the user device 42 may receive the contactless radio signal and decode the tag data to reveal the tag identifier of the contactless communication tag 10. In some embodiments, using the tag identifier, the application of the user device 42 may issue a request to an account management system 300 including a tag query request 43. In some embodiments, the application may include programming to automatically recognize a new virtual card 11 and contactless communication tag 10 from the tag identifier. Thus, the tag query request 43 may include the tag identifier and a request to initialize the virtual card 11 may linking the tag identifier to the user account of the user logged into the application, or to a user account of a another user for whom the user of the user device 42 is acting, such as, e.g., a representative of an entity associated with the account management system 300.

In some embodiments, however, the tag query request 43 may include a query for user accounts associated with the tag identifier. The account management system 300 may utilize to the tag identifier to generate the account link upon determining that the tag identifier is not already linked to another user account. Thus, in some embodiments, the account management system 300 may initialize the virtual card 11 may linking the card to the user account.

In some embodiments, the account management system 300 may search, at block 401, account database for a user account linked to the tag identifier. For example, in some embodiments, the account database 31 may include an index or look-up table associating tag identifiers with accounts or disposable and authoritative account identifiers. However, in some embodiments, account records may be tagged with associated tag identifiers such that the account management system 300 may search the account records with a suitable database request to identify the account associated with the tag identifier.

In some embodiments, the account management system 300 may determine, at block 402, a new contactless tag upon finding no linked user account in the account database 31. Thus, the contactless communication tag 10 is recognized as a new, uninitialized tag. As a result, a tag initialization process may be triggered to initialize the contactless communication tag 10 as a disposable activity authorization method for the user account of the user of the user device 42.

In some embodiments, the account management system 300 may generate, at block 403, a disposable account card identifier in a user account of the user. In some embodiments, to ensure confidentiality and security of the account identifier of the user account, the account management system 300 may generate (e.g., by random number generation or by random selection of a list of candidate numbers), a unique disposable account number to use as a disposable account identifier. In some embodiments, the account management system 300 may generate the disposable account identifier and append it to the user account record for temporary use to process activities authorized using the disposable account identifier. Thus, the disposable account identifier may be used in place or as a proxy of the account identifier of the user account until the disposable account identifier is deleted or it expires.

In some embodiments, the account management system 300 may generate the disposable account identifier with an attribute flagging the disposable account identifier for automatic deletion after a predetermined period. The predetermined period may be a preset period by the account management system 300, such as, e.g., about one day, about one week, about one month, or some other suitable length of time. However, in some embodiments, the user may determine the predetermined period during the initialization process via the user device 42. Upon the predetermined period, the account management system 300 may automatically delete the disposable account identifier.

In some embodiments, the account management system 300 may link, at block 404, the tag identifier to the disposable account identifier. As described above, the account database 31 may include an index or look-up table linking tag identifiers with account identifiers. As such, the account management system 300 may append an entry to the index or look-up table for the tag identifier-disposable account identifier pair for the user account. However, in some embodiments, the account management system 300 may instead append the tag identifier to metadata of the disposable account identifier in the user account record, or append the tag identifier to the user account record and append the disposable account number to metadata of the tag identifier in the user account record. Other suitable mechanisms for linking the disposable account identifier to the user account and to the tag identifier may be employed such that the tag identifier may reference the user account via the disposable account identifier.

In some embodiments, the account management system 300 may generate, at block 405, an interface enabling a user to view a transaction record for the disposable account card identifier and to delete the link. In some embodiments, the interface may include a disposable account card interface that provide confirmation or a notification of the disposable account identifier and tag identifier linked to the user account, as well as visualizations of the user account activity record, an activity record of activities authorized using the contactless communication tag, tag identifier and disposable account identifier, among other account information related to the disposable account identifier.

In some embodiments, the user at the user device 42 may desire to manually delete the disposable account identifier, such as when the user believes that the security or confidentiality of the disposable account identifier has been compromised. Thus, the account management system may provide to the user device 42, e.g., via a disposable account card interface of the application, an interface element for initiating the deletion to remove the disposable account identifier of the user account record, and thereby remove the link between the virtual card 11 and the user account.

Figure 5:
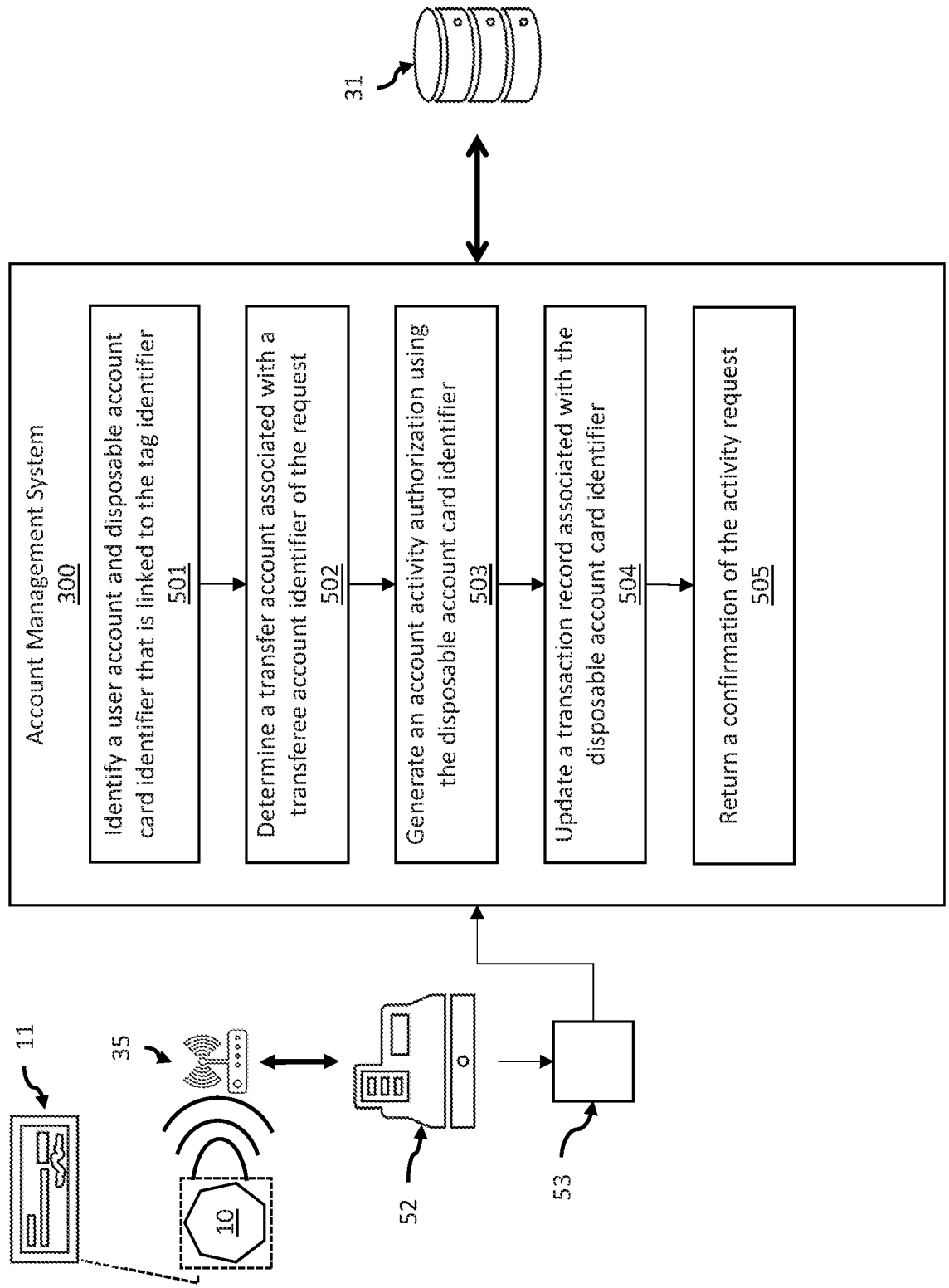

FIG. 5 is a block diagram of another exemplary computer-based system and platform for account activity authorization using a virtual card with a contactless tag in accordance with one or more embodiments of the present disclosure.

In some embodiments, a point-of-sale device 42 running activity authorization software may control an interrogator 35 to emit an electromagnetic field. In some embodiments, upon the virtual card 11 with the contactless communication tag 10 being brought into the vicinity of the interrogator 35, the electromagnetic field of the interrogator 35 may power the contactless communication tag 10. As a result, the contactless communication card 10 automatically emits a response signal to the interrogator 35. In some embodiments, response signal includes a contactless radio signal carrying tag data from the integrated circuit of the contactless communication tag 10.

In some embodiments, the application on the point-of-sale device 42 may receive the contactless radio signal and decode the tag data to reveal the tag identifier of the contactless communication tag 10. In some embodiments, using the tag identifier, the activity authorization software of the point-of-sale device 42 may issue an electronic activity authorization 43 request to an account management system 300 including the tag identifier, a transferee account identifier the account of an intended transferee of the activity, and a data transfer content indicative of the content of the transfer of the account activity being authorized. In some embodiments, the point-of-sale device 42 may automatically identify the transferee account identifier and data transfer content based on user and transferee interactions with the point-of-sale device 42, e.g., selecting or scanning items for purchase from an owner of the point-of-sale device 42, or other in-person transaction.

In some embodiments, in response to receiving the activity authorization request 43, the account management system 300 may identify, at block 501, a user account and disposable account card identifier that is linked to the tag identifier. In some embodiments, the account database 31 may include an index or look-up table linking tag identifiers with account identifiers. As such, the tag identifier may be record as an entry to the index or look-up table for a tag identifier-disposable account identifier pair for a user account. However, in some embodiments, the tag identifier may instead be tagged in metadata of an associated disposable account identifier in a user account record. Other suitable mechanisms for linking the tag identifier with the disposable account identifier to the user account may be employed such that the account management system 300 may reference the tag identifier to identifier the associated disposable account identifier.

In some embodiments, the disposable account identifier may similar reference the associated user account in the account database 31. As a result, the account management system 300 may utilize the tag identifier to determine the disposable account identifier, such as a unique disposable account number, with which to authorize account activities rather than using a reference to the authoritative account number of the user account.

In some embodiments, upon accessing the disposable account identifier, the account management system 300 may determine, at block 502 a transfer account associated with a transferee account identifier of the request. In some embodiments, the account activity request 53 may include the transferee account identifier. Thus, using the transferee account identifier, the account management system 300 may identify the transferee account to which to authorize a transfer of the account activity using the disposable account identifier.

In some embodiments, the account management system 300 may generate, at block 503, an account activity authorization using the disposable account card identifier. In some embodiments, the account management system 300 may fulfill the account activity request 53 by authorizing and initiate the transfer from the user account to the transferee account using the disposable account identifier. In some embodiments, the transfer may include, e.g., a monetary transfer, data transfer, or other account transfer as requested according to the data transfer contents.

In some embodiments, the account management system 300 may update, at block 504, a transaction record associated with the disposable account card identifier. In some embodiments, the account management system 300 may use the disposable account identifier to append a transaction entry in the user account including the transfer of the account activity request 53.

In some embodiments, the account management system 300 may return, at block 505, a confirmation of the activity request. Additionally, the account management system 300 may notify the user of the transfer via, e.g., a disposable account card interface. In some embodiments, the account management system 300 may cause the disposable account card interface to be displayed on a display of at least one computing device associated with the contactless reader. In some embodiments the disposable account card interface may include the transaction record associated with the account activity request 53 using the contactless communication tag and a user interface element enabling a user to delete the account link to remove the disposable account card data from the user account if the user did not authorize the transfer, thus indicating a compromise of the disposable account identifier and/or tag identifier.

Figure 6:
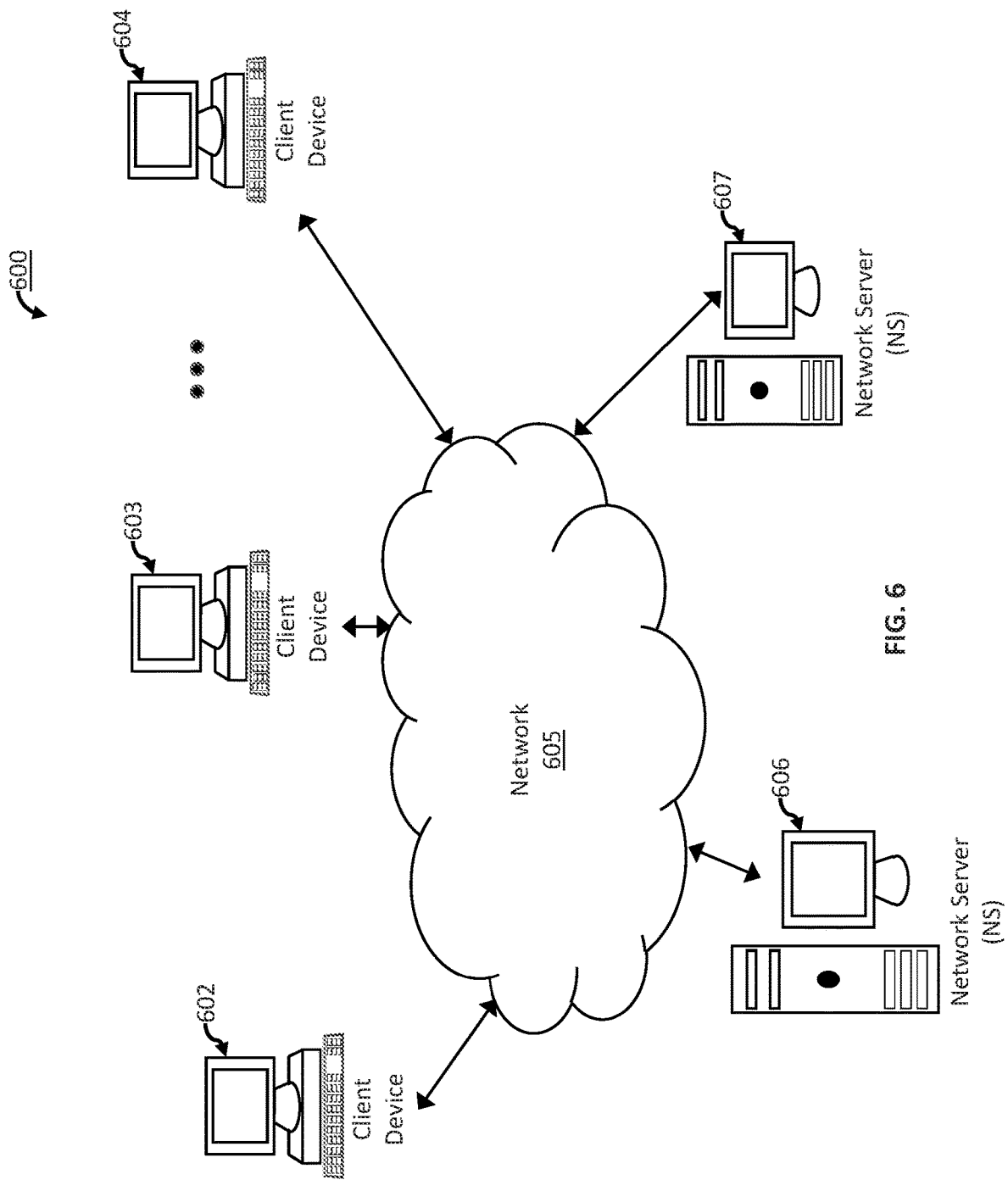

FIG. 6 depicts a block diagram of an exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, members 602-604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more-member devices within member devices 602-604 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more-member devices within member devices 602-604 may include may run one or more applications, such as Internet browsers, mobile applications, voice calls, video games, videoconferencing, and email, among others. In some embodiments, one or more-member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++ and/or other suitable programming language. In some embodiments, one or more-member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 605 may also include mass storage, such as network attached storage (NAS), a storage area network (SAN), a content delivery network (CDN) or other forms of computer or machine-readable media.

In some embodiments, the exemplary server 606 or the exemplary server 607 may be a web server (or a series of servers) running a network operating system, examples of which may include but are not limited to Microsoft Windows Server, Novell NetWare, or Linux. In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
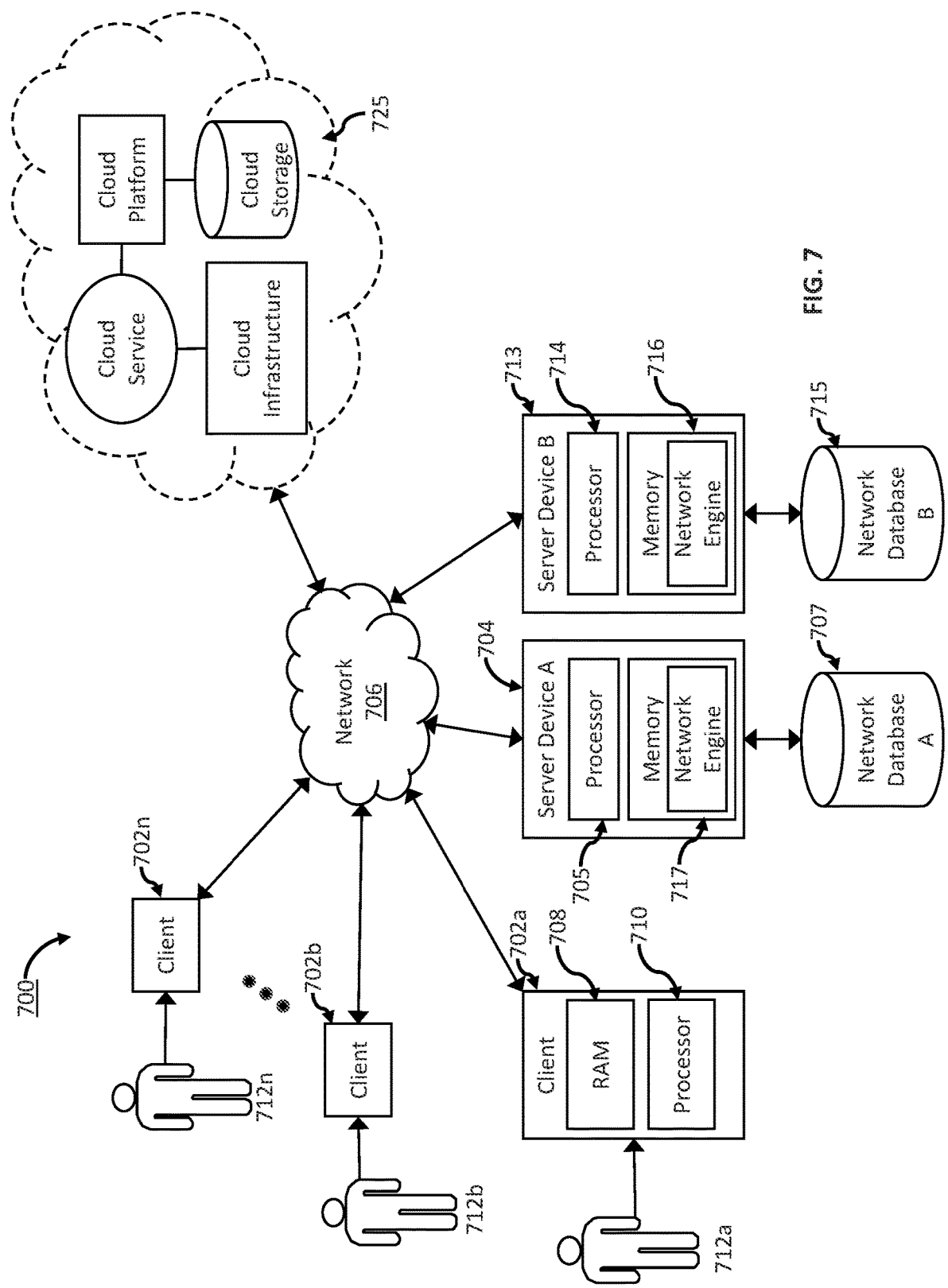

FIG. 7 depicts a block diagram of another exemplary computer-based system and platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 702*a*, 702*b* thru 702*n* shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702a through 702n may also comprise a number of external or internal devices such as a mouse, a CD-ROM, DVD, a physical or virtual keyboard, a display, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™ Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, users, 712a through 702n, may communicate over the exemplary network 706 with each other and/or with other systems and/or devices coupled to the network 706. As shown in FIG. 7, exemplary server devices 704 and 713 may be also coupled to the network 706. In some embodiments, one or more-member computing devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
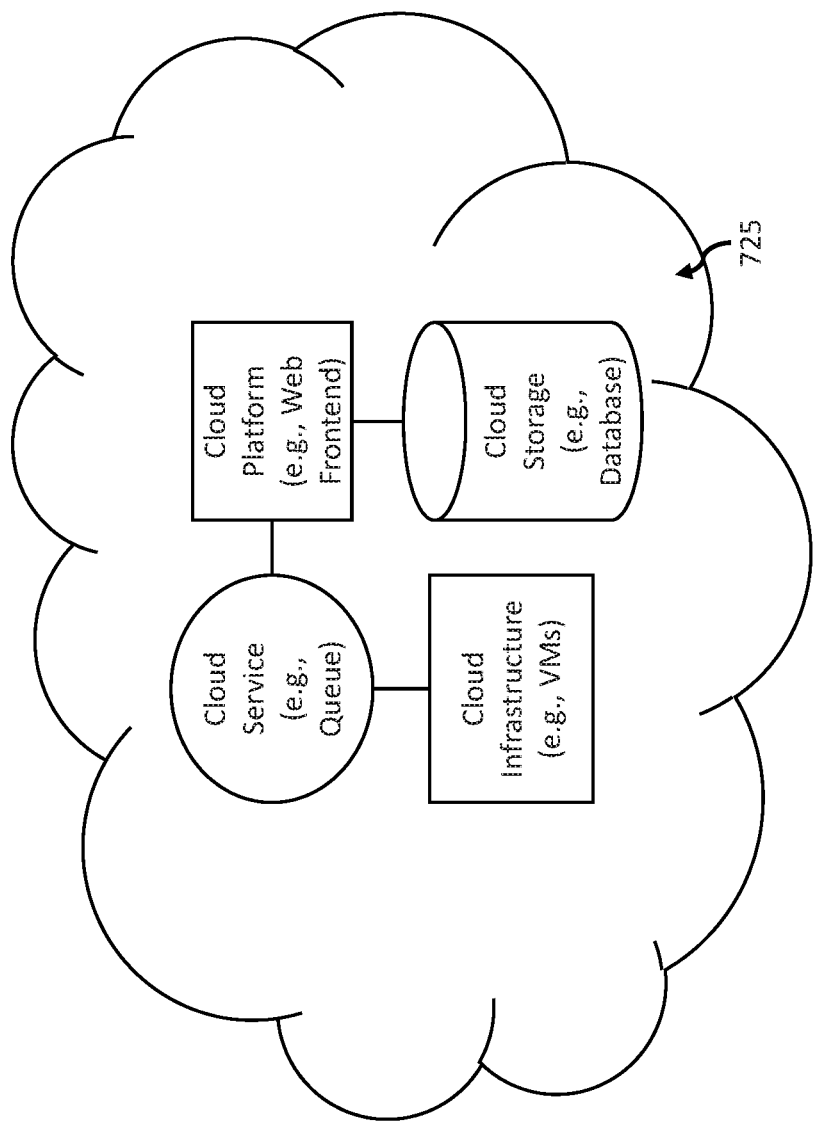
Figure 9:
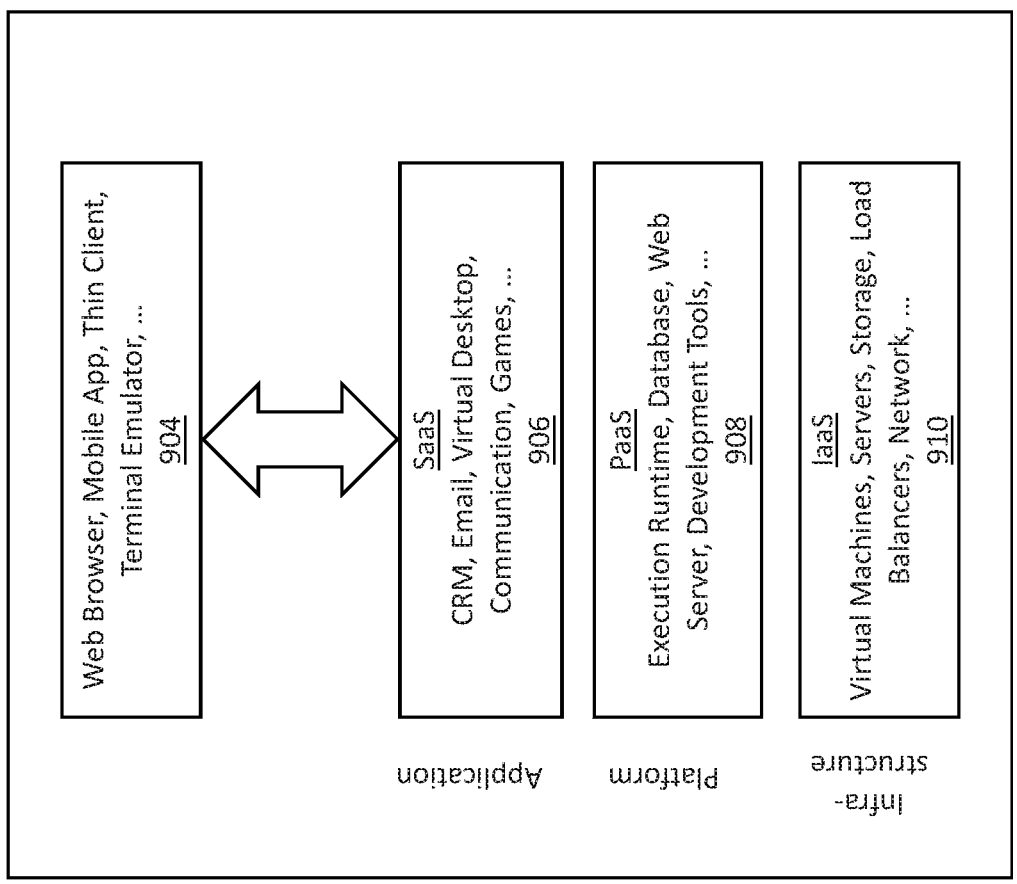

In some embodiments, the exemplary inventive computer-based systems/platforms, the exemplary inventive computer-based devices, and/or the exemplary inventive computer-based components of the present disclosure may be specifically configured to operate in a cloud computing/architecture 725 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, hand-held computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9, 999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

At least some aspects of the present disclosure will now be described with reference to the following numbered clauses.

1. A method comprising:
   receiving, by at least one processor of at least one computing device via an antenna module from a contactless reader of the at least one computing device, a contactless radio signal data of a contactless radio signal emitted by a contactless communication tag in response to an interrogation signal;
      wherein the contactless radio signal data comprises encoded tag data;
      wherein the encoded tag data comprises a tag identifier of the contactless communication tag;
   determining, by the at least one processor, that the contactless communication tag is a new contactless communication tag based on the tag identifier being unlinked to any user account;
   generating, by the at least one processor, disposable account card identifier in in a user account, the disposable account card identifier comprising a unique disposable account number;
   generating, by the at least one processor, an account link that links the tag identifier to the disposable account card identifier such that the tag identifier refers to the unique disposable account number for performing contactless electronic requests to the user account in place of a user account card;
   generating, by the at least one processor, a disposable account card interface and a user interface element;
      wherein the disposable account card interface is configured to allow the user to perform the contactless electronic requests with the contactless communication tag and wherein the user interface element is configured to enable a user to delete the account link to remove a reference between the disposable account card identifier and the user account; and causing to display, by the at least one processor, the disposable account card interface on a display of at least one computing device associated with the contactless reader.
2. The method of clause 1, further comprising:
determining, by the at least one processor, a user authentication for an application in communication with the contactless reader; and
generating, by the at least one processor, the user account data based at least in part on the user authentication.
3. The method of clause 2, further comprising automatically generating, by the at least one processor, the account link upon determining the user authentication.
4. The method of clause 1, further comprising:
receiving, by the at least one processor, an authentication request associated with the user account to access the user account;
determining, by the at least one processor, an authentication of the user account linked to the tag identifier; and
causing to display, by the at least one processor, the disposable account card interface;
receiving, by the at least one processor, a delete request in response to a user selection of the user interface element; and
removing, by the at least one processor, the account link from the user account to prevent further contactless electronic requests using the contactless communication tag.
5. The method of clause 1, wherein the user account card comprising a credit card and the user account comprises a credit account associated with the credit card.
6. The method of clause 1, wherein the contactless communication tag comprises a near field communication (NFC) chip.
7. The method of clause 1, wherein the contactless communication tag comprises a radio frequency identification (RFID) chip.
8. The method of clause 1, wherein the contactless reader comprises a smartphone.
9. The method of clause 1, further comprising:
receiving, by the at least one processor, a second contactless radio signal carrying second tag data associated with a second contactless communication tag; and
generating, by the at least one processor, a second account link linking a second tag identifier of the second tag data to the user account associated with the user account identifier.
10. The method of clause 9, further comprising automatically deleting, by the at least one processor, the account link in response to the generating of the second account link.
11. A method comprising:
receiving, by at least one processor, an electronic account activity request from at least one computing device;
wherein the electronic account activity request comprises:
i) a tag identifier decoded from an encoded tag data of a contactless radio signal data of a contactless radio signal emitted by a contactless communication tag in response to an interrogation signal by a contactless reader of the at least one computing device;
ii) a data transfer content associated with a requested data transfer, and
iii) a transferee account identifier identifying a destination account for the requested data transfer;
determining, by the at least one processor, an account link that links the contactless communication tag to a user account by using the tag identifier to refer to a unique disposable account card identifier;
determining, by the at least one processor, disposable account card identifier associated with the tag identifier based on the account link;
wherein the disposable account card identifier comprising a unique disposable account number;
generating, by the at least one processor, an account activity authorization associated with the disposable account card identifier to fulfill the electronic account activity request by transferring the requested transfer quantity from the user account to the destination account based at least in part on the unique disposable account number, the data transfer content and the transferee account identifier;
updating, by the at least one processor, a disposable account card interface and a user interface element;
wherein the disposable account card interface is configured to allow a user to delete the account link to remove the disposable account card data from the user account; and
causing to display, by the at least one processor, the disposable account card interface on a
display of at least one computing device associated with the contactless reader.
12. The method of clause 11, wherein the disposable account card data comprises a virtual account card number.
13. The method of clause 12, wherein the virtual account card number is stored as an additional user account card for performing contactless electronic requests in place of a user account card in the user account.
14. The method of clause 13, wherein the user account card comprises a credit card.
15. The method of clause 11, wherein the user account comprises a credit account.
16. The method of clause 11, further comprising:
comparing, by the at least one processor, the tag identifier to a plurality of tag identifiers associated with the user account; and
determining, by the at least one processor, the virtual account card data based on the account link of a matching tag identifier of the plurality of tag identifiers.
17. The method of clause 11, further comprising generating, by the at least one processor, the transaction record to record the virtual card payment data comprising a virtual account card number serving as a proxy for a credit card number associated with the user account.
18. The method of clause 11, wherein the contactless communication tag comprises a near field communication (NFC) chip.
19. The method of clause 11, wherein the contactless communication tag comprises a radio frequency identification (RFID) chip.
20. A system comprising:
at least one processor configured to implement instructions causing the at least one processor to perform steps to:
receive, via an antenna module from a contactless reader, a contactless radio signal data of a contactless radio signal emitted by a contactless communication tag in response to an interrogation signal;
wherein the contactless radio signal data comprises encoded tag data;
wherein the encoded tag data comprises a tag identifier of the contactless communication tag;

determine that the contactless communication tag is a new contactless communication tag based on the tag identifier being unlinked to any user account;
generate disposable account card identifier in in a user account, the disposable account card identifier comprising a unique disposable account number;
generate an account link that links the tag identifier to the disposable account card identifier such that the tag identifier refers to the unique disposable account number for performing contactless electronic requests to the user account in place of a user account card;
generate a disposable account card interface and a user interface element;
wherein the disposable account card interface is configured to allow the user to perform the contactless electronic requests with the contactless communication tag and wherein the user interface element is configured to enable a user to delete the account link to remove a reference between the disposable account card identifier and the user account; and
cause to display the disposable account card interface on a display of at least one computing device associated with the contactless reader.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
providing a physical card having a contactless communication tag physically attached thereto;
receiving, by at least one processor of at least one computing device via an antenna module from a contactless reader of the at least one computing device, a contactless radio signal data of a contactless radio signal emitted by a contactless communication tag in response to an interrogation signal;
wherein the contactless radio signal data comprises encoded tag data;
wherein the encoded tag data comprises a tag identifier of the contactless communication tag;
determining, by the at least one processor, that the contactless communication tag is a new contactless communication tag based on the tag identifier being unlinked to any user account;
generating, by the at least one processor, a disposable account card data for a user account, the disposable account card data comprising a unique disposable account number;
wherein the user account comprises a permanent account number different from the unique disposable account number;
generating, by the at least one processor, an account link that links the tag identifier to:
the disposable account card data, and
the permanent account number associated with the user account;
wherein the account link comprises an expiration period;
wherein the expiration period is configured to cause the at least one processor to unlink the unique disposable account number from the user account at the end of the expiration period;
writing, by the at least one processor using a return contactless radio signal, the unique disposable account number to the tag data of the contactless communication tag of the physical card to enable contactless user account activity using the user account via the unique disposable account number in place of the permanent account number;
generating, by the at least one processor, a disposable account card interface and a user interface element;
wherein the disposable account card interface is configured to allow the user to perform the contactless electronic requests with the contactless communication tag and wherein the user interface element is configured to enable a user to delete the account link to remove a reference between the disposable account card identifier and the user account; and
causing to display, by the at least one processor, the disposable account card interface on a display of at least one computing device associated with the contactless reader.

2. The method of claim 1, further comprising:
determining, by the at least one processor, a user authentication for an application in communication with the contactless reader; and
generating, by the at least one processor, the user account data based at least in part on the user authentication.

3. The method of claim 2, further comprising automatically generating, by the at least one processor, the account link upon determining the user authentication.

4. The method of claim 1, further comprising:
receiving, by the at least one processor, an authentication request associated with the user account to access the user account;
determining, by the at least one processor, an authentication of the user account linked to the tag identifier; and
causing to display, by the at least one processor, the disposable account card interface;
receiving, by the at least one processor, a delete request in response to a user selection of the user interface element; and
removing, by the at least one processor, the account link from the user account to prevent further contactless electronic requests using the contactless communication tag.

5. The method of claim 1, wherein the user account card comprising a credit card and the user account comprises a credit account associated with the credit card.

6. The method of claim 1, wherein the contactless communication tag comprises a near field communication (NFC) chip.

7. The method of claim 1, wherein the contactless communication tag comprises a radio frequency identification (RFID) chip.

8. The method of claim 1, wherein the contactless reader comprises a smartphone.

9. The method of claim 1, further comprising:
receiving, by the at least one processor, a second contactless radio signal carrying second tag data associated with a second contactless communication tag; and generating, by the at least one processor, a second account link linking a second tag identifier of the second tag data to the user account associated with the user account identifier.

10. The method of claim 9, further comprising automatically deleting, by the at least one processor, the account link in response to the generating of the second account link.

11. A method comprising:
providing a physical card having a contactless communication tag physically attached thereto;
receiving, by at least one processor, an electronic account activity request from at least one computing device;
wherein the electronic account activity request comprises:
i) a tag identifier decoded from an encoded tag data of a contactless radio signal data of a contactless radio signal emitted by a contactless communication tag in response to an interrogation signal by a contactless reader of the at least one computing device;
ii) a data transfer content associated with a requested data transfer, and
iii) a transferee account identifier identifying a destination account for the requested data transfer;
determining, by the at least one processor, an account link that links the contactless communication tag to a user account by using the tag identifier to refer to a unique disposable account card identifier;
wherein the account link comprises an expiration period;
wherein the expiration period is configured to cause the at least one processor to unlink the unique disposable account number from the user account at the end of the expiration period;
determining, by the at least one processor, disposable account card identifier associated with the tag identifier based on the account link;
wherein the disposable account card identifier comprising a unique disposable account number;
generating, by the at least one processor, an account activity authorization associated with the disposable account card identifier to fulfill the electronic account activity request by transferring the requested transfer quantity from the user account to the destination account based at least in part on the unique disposable account number, the data transfer content and the transferee account identifier;
updating, by the at least one processor, a disposable account card interface and a user interface element;
wherein the disposable account card interface is configured to allow a user to delete the account link to remove the disposable account card data from the user account; and
causing to display, by the at least one processor, the disposable account card interface on a display of at least one computing device associated with the contactless reader.

12. The method of claim 11, wherein the disposable account card data comprises a virtual account card number.

13. The method of claim 12, wherein the virtual account card number is stored as an additional user account card for performing contactless electronic requests in place of a user account card in the user account.

14. The method of claim 13, wherein the user account card comprises a credit card.

15. The method of claim 11, wherein the user account comprises a credit account.

16. The method of claim 11, further comprising:
comparing, by the at least one processor, the tag identifier to a plurality of tag identifiers associated with the user account; and
determining, by the at least one processor, the virtual account card data based on the account link of a matching tag identifier of the plurality of tag identifiers.

17. The method of claim 11, further comprising generating, by the at least one processor, the transaction record to record the virtual card payment data comprising a virtual account card number serving as a proxy for a credit card number associated with the user account.

18. The method of claim 11, wherein the contactless communication tag comprises a near field communication (NFC) chip.

19. The method of claim 11, wherein the contactless communication tag comprises a radio frequency identification (RFID) chip.

20. A system comprising:
a physical card having a contactless communication tag physically attached thereto;
at least one processor configured to implement instructions causing the at least one processor to perform steps to:
receive, via an antenna module from a contactless reader, a contactless radio signal data of a contactless radio signal emitted by a contactless communication tag in response to an interrogation signal;
wherein the contactless radio signal data comprises encoded tag data;
wherein the encoded tag data comprises a tag identifier of the contactless communication tag;
determine that the contactless communication tag is a new contactless communication tag based on the tag identifier being unlinked to any user account;
generate a disposable account card data for a user account, the disposable account card data comprising a unique disposable account number;
wherein the user account comprises a permanent account number different from the unique disposable account number;
generate an account link that links the tag identifier to:
the disposable account card data, and
the permanent account number associated with the user account;
wherein the account link comprises an expiration period;
wherein the expiration period is configured to cause the at least one processor to unlink the unique disposable account number from the user account at the end of the expiration period;
writing, by the at least one processor using a return contactless radio signal, the unique disposable account number to the tag data of the contactless communication tag of the physical card to enable contactless user account activity using the user account via the unique disposable account number in place of the permanent account number;
generate a disposable account card interface and a user interface element;
wherein the disposable account card interface is configured to allow the user to perform the contactless electronic requests with the contactless communication tag and wherein the user interface element is configured to enable a user to delete the account link to remove a reference between the disposable account card identifier and the user account; and cause to display the disposable account card interface on a display of at least one computing device associated with the contactless reader.

* * * * *